United States Patent [19]

Deutsch et al.

[11] Patent Number: 5,226,175
[45] Date of Patent: Jul. 6, 1993

[54] TECHNIQUE FOR REPRESENTING SAMPLED IMAGES

[75] Inventors: Keith R. Deutsch, Amherst; Per H. Bjorge, Hollis; Alan Blannin, Amherst, all of N.H.

[73] Assignee: Graphic Edge, Inc., Amherst, N.H.

[21] Appl. No.: 679,167

[22] Filed: Mar. 26, 1991

Related U.S. Application Data

[63] Continuation of Ser. No. 383,400, Jul. 21, 1989, abandoned.

[51] Int. Cl.$^5$ .............................................. G06F 15/20
[52] U.S. Cl. .................................. 395/119; 395/132; 395/134
[58] Field of Search .................. 364/518, 521, 522; 382/22, 23; 395/162, 166, 119-121, 133, 132, 134

[56] References Cited

U.S. PATENT DOCUMENTS

| | | | |
|---|---|---|---|
| 3,215,772 | 11/1965 | Chatten et al. | 178/6.8 |
| 4,222,076 | 9/1980 | Knowlton | 364/515 X |
| 4,615,013 | 9/1986 | Yan et al. | 364/521 |
| 4,631,690 | 12/1986 | Corthout et al. | 364/518 |

FOREIGN PATENT DOCUMENTS

| | | |
|---|---|---|
| 0163898 | 4/1985 | European Pat. Off. . |
| 0220706 | 10/1986 | European Pat. Off. . |
| 2559979 | 2/1984 | France . |

OTHER PUBLICATIONS

The Bettex News Release, circa 1987.
"Symbolic Processing and Pipelining Advance Graphics Performance", Bjorge, P., circa 1987.
"The Bettex Technology", circa 1987.
"Speedy Graphics System Powered by Three Micros Operating in Parallel", EP & P 87, Jun./Jul. 1987.
*The Seybold Report on Publishing Systems*, Jun. 29, 1987, pp. 22-24.
*The Seybold Report on Publishing Systems*, Nov. 24, 1986, pp. 25-27.

*Primary Examiner*—Heather R. Herndon
*Attorney, Agent, or Firm*—Cesari & McKenna

[57] ABSTRACT

A technique for developing an analytic model of an image by operating directly upon the pixel map representation output by an optical sampling device, such as a scanner. The resulting analytic representation is hierarchical, below a certain level, with each element an analytic expression representing a portion of the image. Above a certain level, the model is a simple array, to facilitate certain types of graphical manipulations. The model is developed by arranging pixel values into a number of groups called tiles. A number of operations are then performed on each tile, to determine how it can best be represented as an analytic expression. For example, if all pixel values in a tile are approximately continuously varying, they be represented as a three-dimensional linearly sloped surface. However, if one or more intensity boundaries run through the tile, analytic expressions, such as a straight line or a parabolic line segment, are derived from the tile's pixel values to describe the edges.

22 Claims, 17 Drawing Sheets

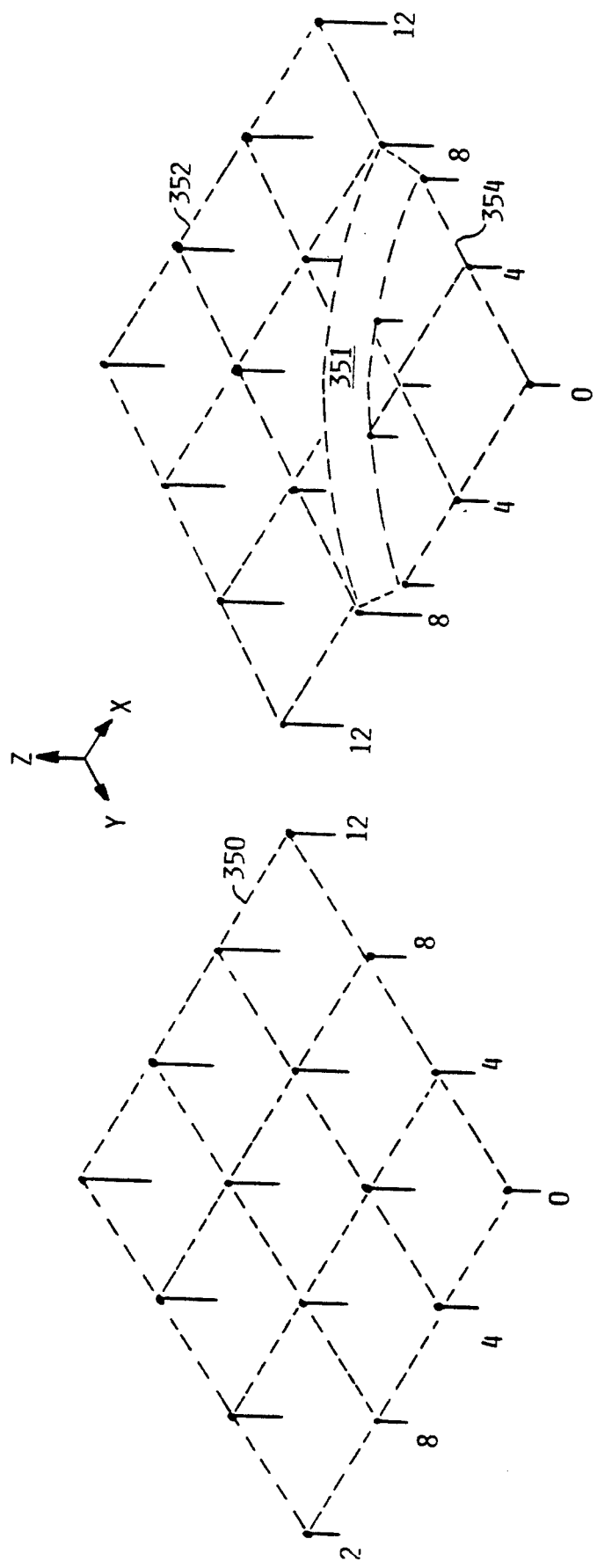

FIG. 6A

|    | 0   | 1   | 2   | 3   | 4   | 5   | 6   | 7   | 8   | 9   | 10  | 11  | 12  |
|----|-----|-----|-----|-----|-----|-----|-----|-----|-----|-----|-----|-----|-----|
| 1  | 241 | 240 | 242 | 241 | 243 | 244 | 243 | 243 | 243 | 243 | 242 | 243 | 243 |
| 2  | 241 | 240 | 241 | 241 | 242 | 243 | 242 | 243 | 243 | 242 | 244 | 243 | 243 |
| 3  | 243 | 243 | 243 | 242 | 243 | 245 | 244 | 245 | 244 | 246 | 245 | 245 | 245 |
| 4  | 242 | 241 | 240 | 241 | 240 | 242 | 243 | 244 | 244 | 244 | 243 | 243 | 242 |
| 5  | 243 | 242 | 243 | 241 | 241 | 244 | 239 | 243 | 245 | 243 | 244 | 242 | 244 |
| 6  | 242 | 242 | 244 | 240 | 240 | 242 | 239 | 242 | 242 | 243 | 243 | 243 | 243 |
| 7  | 244 | 243 | 244 | 243 | 243 | 243 | 241 | 243 | 243 | 244 | 244 | 245 | 244 |
| 8  | 242 | 242 | 243 | 241 | 241 | 241 | 238 | 240 | 241 | 241 | 241 | 243 | 242 |
| 9  | 244 | 245 | 243 | 245 | 243 | 244 | 242 | 241 | 242 | 241 | 243 | 243 | 244 |
| 10 | 242 | 242 | 242 | 242 | 241 | 242 | 240 | 241 | 236 | 240 | 238 | 239 | 239 |
| 11 | 242 | 242 | 244 | 243 | 243 | 242 | 241 | 241 | 240 | 240 | 239 | 239 | 239 |
| 12 | 242 | 241 | 241 | 241 | 242 | 243 | 241 | 241 | 240 | 239 | 238 | 236 | 236 |

| 241 | 241 | 241 | 241 | 242 | 242 | 242 | 242 | 243 | 243 | 243 | 243 | 243 |
| 241 | 241 | 241 | 241 | 242 | 242 | 242 | 242 | 243 | 243 | 243 | 243 | 242 |
| 241 | 241 | 241 | 242 | 242 | 242 | 242 | 243 | 243 | 243 | 243 | 242 | 242 |
| 241 | 241 | 241 | 242 | 242 | 242 | 242 | 243 | 243 | 242 | 242 | 241 | 241 |
| 241 | 241 | 242 | 242 | 242 | 242 | 242 | 243 | 242 | 242 | 241 | 241 | 241 |
| 241 | 241 | 242 | 242 | 242 | 242 | 243 | 242 | 242 | 241 | 241 | 240 | 240 |
| 241 | 241 | 242 | 242 | 242 | 242 | 242 | 241 | 241 | 240 | 240 | 239 | 239 |
| 241 | 241 | 242 | 242 | 242 | 241 | 241 | 240 | 240 | 240 | 239 | 238 | 238 |
| 241 | 242 | 242 | 242 | 242 | 241 | 241 | 240 | 240 | 239 | 239 | 238 | 237 |
| 241 | 242 | 242 | 241 | 241 | 240 | 240 | 239 | 239 | 238 | 238 | 237 | 237 |
| 241 | 242 | 241 | 241 | 240 | 240 | 239 | 239 | 238 | 238 | 237 | 237 | 236 |
| 242 | 241 | 241 | 240 | 240 | 239 | 239 | 238 | 238 | 237 | 237 | 236 | 236 |

|    | B1  | B2  | 1   | 2   | 3   | 4   | 5   | 6   | 7   | 8   | 9   | 10  | 11  | 12  | B3  | B4  |
|----|-----|-----|-----|-----|-----|-----|-----|-----|-----|-----|-----|-----|-----|-----|-----|-----|
| B1 | 185 | 152 | 127 | 133 | 133 | 120 | 129 | 112 | 126 | 114 | 132 | 122 | 136 | 162 | 193 | 222 |
| B2 | 212 | 187 | 160 | 140 | 137 | 133 | 126 | 123 | 123 | 130 | 131 | 136 | 153 | 193 | 220 | 230 |
| 1  | 225 | 225 | 210 | 179 | 162 | 140 | 130 | 130 | 134 | 130 | 140 | 166 | 197 | 229 | 229 | 234 |
| 2  | 229 | 223 | 224 | 212 | 186 | 160 | 133 | 126 | 126 | 131 | 158 | 198 | 226 | 226 | 227 | 232 |
| 3  | 222 | 228 | 223 | 225 | 219 | 205 | 180 | 155 | 151 | 161 | 206 | 227 | 223 | 236 | 222 | 211 |
| 4  | 179 | 214 | 225 | 225 | 224 | 215 | 204 | 193 | 181 | 221 | 218 | 233 | 223 | 228 | 208 | 168 |
| 5  | 154 | 168 | 193 | 212 | 218 | 200 | 209 | 214 | 219 | 225 | 227 | 226 | 222 | 205 | 173 | 143 |
| 6  | 155 | 143 | 155 | 179 | 211 | 206 | 219 | 232 | 229 | 227 | 233 | 230 | 211 | 172 | 138 | 126 |
| 7  | 146 | 125 | 129 | 136 | 174 | 219 | 230 | 233 | 229 | 232 | 223 | 222 | 187 | 153 | 127 | 138 |
| 8  | 142 | 126 | 122 | 142 | 186 | 230 | 234 | 237 | 236 | 230 | 225 | 225 | 217 | 197 | 163 | 149 |
| 9  | 131 | 123 | 140 | 187 | 229 | 229 | 232 | 235 | 229 | 230 | 227 | 229 | 225 | 223 | 210 | 187 |
| 10 | 130 | 155 | 193 | 227 | 229 | 232 | 234 | 213 | 185 | 185 | 211 | 226 | 222 | 223 | 224 | 222 |
| 11 | 158 | 197 | 229 | 227 | 234 | 235 | 209 | 179 | 140 | 145 | 157 | 202 | 218 | 230 | 226 | 227 |
| 12 | 215 | 233 | 234 | 237 | 234 | 216 | 175 | 140 | 129 | 131 | 132 | 143 | 179 | 209 | 226 | 237 |
| B3 | 223 | 234 | 237 | 237 | 205 | 181 | 133 | 137 | 115 | 122 | 123 | 128 | 134 | 172 | 215 | 234 |
| B4 | 234 | 234 | 231 | 208 | 164 | 130 | 129 | 116 | 114 | 118 | 121 | 126 | 139 | 149 | 195 | 227 |

FIG. 7B

| | val to val | count |
|---|---|---|
| min    | 112 – 133 | 47  |
| lower  | 134 – 154 | 30  |
| low    | 155 – 174 | 21  |
| high   | 175 – 195 | 24  |
| higher | 196 – 216 | 33  |
| max    | 217 – 237 | 101 | dv = 21.

STBEG. 150,210 ⟩ 800

LRUN: 154, 153, 154, 155, 163, 181, 163, 158, ⎫
      156, 161, 161, 160, 156, 156, 157, 159, ⎬ 801
      160, 160, 156, 159, 156, 161, 159, 161, ⎪
      158, 157, 156, 159, 156, 159, 159, 159 ⎭

BRUN: 151, 156, 155, 152, 174, 195, 196, 196, ⎫
      196, 197, 196, 196, 197, 197, 195, 195, ⎬ 802
      196, 197, 196, 197, 197, 195, 198, 196, ⎪
      194, 197, 197, 197, 197, 196, 198, 197 ⎭

805 { PUSH
        PUSH
                         806
            PUSH

GREY: 198
        EDGES: 197, 149, 1:0
                197 :: LIST-TB, 9:9, 2, 10:3, 10:4
        GREY5: 195, 13, 0:99, 0:82, 0:112, 0:33, 0:124
        PLB: 10:9, 197, 10:10
PUSH
        GREY: 199
        GREY: 197
        GREY: 196
        GREY1: 197, 1, 0:30
PUSH
        PTB: 7:8, 196, 7:12
        GREY: 197
        LTB: 7:7, 196
        GREY1: 197, 1, 0:63
PUSH
        GREY: 197
        GREY: 196
        GREY: 197
        GREY1: 199, 2, 0:31

FIG. 8-1

```
GREY: 195
PUSH
        PUSH
                PTB: 6:7, 196, 6:12
                GREY: 197
                LTB: 6:6, 196
                GREY1: 196, 3, 0:62
        PUSH
                GREY: 197
                GREY: 196
                GREY: 197
                GREY1: 195, 1, 0:92
        PUSH
                LTB: 6:6, 196
                GREY: 197
                LTB: 5:6, 196
                GREY: 197
        PUSH
                GREY: 197
                GREY2: 196, 3, 0:86, 0:56
                GREY: 197
                GREY1: 197, 2, 0:61
   PUSH
        GREY: 196
        GREY: 196
        PUSH
                GREY: 193
                GREY: 195
                GREY1: 196, 1, 0:119
                GREY1: 195, 1, 0:93
        PUSH
                GREY: 195
                GREY: 195
                GREY1: 196, 1, 0:67
                GREY: 196
```

FIG. 8-2

TECHNIQUE FOR REPRESENTING SAMPLED IMAGES

This application is a continuation of a prior U.S. patent application Ser. No. 07/383,400, filed Jul. 21, 1989, now abandoned.

FIELD OF THE INVENTION

This invention relates generally to computer graphics, and particularly to a technique for representing sampled images.

BACKGROUND OF THE INVENTION

Computer-readable representations of real-world source images are generated in a number of different ways, such as by using a scanner or digital camera. These devices optically scan the real image and produce a sampled video signal. Each sample of the video signal is a digital value, called a pixel value. The value of a pixel corresponds to the light intensity, or some colorimetric property, of a particular point in the real image. The sampled video signal is then typically read by a computer, which then organizes the pixels into a two-dimensional array called a pixel map. Each pixel value in the pixel map thus represents the intensity of a corresponding elemental area of the real image. The array coordinates at which a pixel value is stored are determined by the spatial position of its corresponding elemental area in the source image.

The resolution of the resulting computer-readable image representation depends upon the number of pixel map entries, as well as the number of different levels used in digitizing the sampled video signal. For example, even if a fairly small 3 by 5 inch photograph is scanned at what is considered to be a medium resolution of 300 pixels per inch, the pixel map is 900 by 1500, or 1.35 million pixel values. If each sample of the video signal is digitized to one of 256 possible levels, requiring eight bits per pixel, the pixel map occupies 1.35 megabytes of memory.

While a data file of that size is not unmanageable with present-day computer technology, it is too large for most applications, which typically require the storage and handling of a number of images. It is clear, therefore, that a more efficient mechanism for handling scanned images is desirable.

It is also desirable to provide a mechanism whereby an image sampled at one resolution can be subjected to various manipulations, and then be displayed or printed at a different resolution. When this is possible, an image can be rendered on output devices having a range of resolutions, regardless of the resolution of the original pixel map. Pixel map representations are usually not easily processed in this manner, since only a discrete number of samples of the source image are available.

In other words, sampled images should be represented in a condensed form, and yet be readily amenable to scaling, rotating, clipping, windowing, and other manipulations which are commonly performed on synthetic computer-originated images.

Certain images, such as type fonts, can already be represented in raster-image processable form. Such font images are typically susceptible to specification by a human as analytic descriptions of the outlines of each character. The analytic descriptions can be a series of lines, arcs, or other graphic primitive elements. Then, when a character needs to be rendered, the analytic expressions can be easily subjected to the desired graphic manipulations.

Others have proposed various ways to model a graphic object, given an analytic description of the image as an input. Such models are usually in the form of a linked list with pointers to successively smaller portions of the object. A computer builds the model by evaluating the analytic expression for one portion of the image at a time. For example, if the object is a sphere, a mathematical representation for the sphere is evaluated in a number of particular spatial ranges, to determine how each portion can be more simply described, say, as a line segment. In order to render the sphere, the linked list is then traversed by evaluating each line segment.

However, conventional wisdom has been that such hierarchal representations cannot easily be derived for sampled images, since there is no pre-existing human-specified analytic description of the image available. And even if such a description can be derived, it is also thought that the overhead of the hierarchal model will be far too large to justify its use.

SUMMARY OF THE INVENTION

In brief summary, we develop an analytic model of an image by operating directly upon the pixel map representation output from an image sampling device, such as a scanner. The analytic model is encoded in a hierarchical data structure, with each element in the hierarchy being an analytic expression for a portion of the image, or a set of pointers to locations of elements at the next lower level of the structure. Failing an analytic expression for a sub-area of the image at the lowest level, a condensed representation of the pixel map is used at that level. Above a certain level, the analytic model is a simple array.

In order to generate the model, the pixel values from the pixel map are first arranged into a set of pixel groups, each of which relates to a sub-area of the image. Each pixel group is analyzed to determine how a corresponding sub-area, or "tile," of the source image is to be represented. A number of operations are performed during this analysis.

Specifically, the operations performed and their order of performance are derived from an empirical understanding of how the human eye and brain perceive an image. In particular, a human eye is normally most sensitive to intensity boundaries, or places in the image where there are sharp demarcations in the intensity, such as at the "edge" of an object. The model thus stores as much information as needed to represent such edges to a desired level of accuracy. The human eye also typically "averages" areas of small intensity difference. Accordingly, as relatively little information as possible is stored for those tiles.

For example, if the pixel values associated with a tile gradually and monotonically change in intensity, they can be represented as a three-dimensional, planar sloped surface that relates the magnitude of each pixel value to its relative position. The gradient of the planar surface can be determined simply from the intensity values at its vertices. Only one vertex value for each such slope tile needs to be stored in the model, since the other vertex values can be determined by examining vertex values associated with adjacent tiles.

However, if an intensity boundary, or edge, passes through the tile, an analytic expression for the path of the edge is derived. In order to determine the best such expression, one or more histograms are made of the pixel values, in a tile to determine if they fall mostly into one or more groups having approximately the same magnitude. A "posterized" version of the tile is then produced by hard-limiting the value of each pixel to one or more threshold values. The edges in such a posterized tile are thereby delineated in sharp contrast. A successive area approximation and edge traversal technique is then used to derive a close approximation to the edges, in terms of line segments, parabolic arcs, or other primitive descriptors. By using pixels from adjacent tiles, it can be insured that edges running through multiple tiles will align properly.

If neither the slope expression nor the edge expression is sufficiently accurate, the tile is sub-divided and the sub-tile pieces are examined to determine if they can be represented as slope expressions. Tiles can be further sub-divided and examined in this manner until a maximum number of subdivisions has been tried.

If, after the maximum number of sub-divisions, the representation is still not sufficiently accurate, the tile is stored as a list of pixel values.

Finally, the resulting analytic expression for the tile are linked in a hierarchical data structure called a quadtree. The maximum number of levels in the quadtree is fixed so that above a certain level the data structure is a simple array. Each element at the top of the hierarchy, called a "supertile," contains pointers to a number of tiles, and also stores all boundary information needed to render its associated tiles.

In the process of creating the quadtree, if four adjacent tiles are sufficiently similar, they are merged. For example, if four adjacent tiles are found to specify the same sloped expression, they are merged into a single quadtree entry at the next highest level. The merging process continues iteratively at higher levels of the quadtree until the highest level is reached or until adjacent tiles are found to be sufficiently dissimilar.

There are several advantages to this approach. In most instances, the invention results in a dramatic reduction in the amount of data required to represent a given source image.

The image representation is free of restrictions originating from the source image sampling device or the output device. Thus, the image can be rendered at one resolution and output to a laser printer, for proof copy, but subjected to a more rigorous half-tone rendering, used with a raster-based typesetter for final printed copy. In addition, images from several different sources with different resolutions can be combined and rendered with the same output resolution.

Because an analytic expression is derived for each sub-area of the image, the resulting representation can be quite efficiently subjected to common graphic manipulations such as scaling, rotation, clipping, etc., as is done for computer-generated art and surface models. The model can thus be treated as a synthetically-derived image. In other words, it need not be rendered, and output parameters need not be associated with it, until a request for presentation is made.

Many image processing techniques are also more efficient to apply, since the representation directly provides certain information concerning the source image, such as the location of its intensity boundaries.

An additional advantage is improved rendering of half-tone images, since the half-tone dots can be formed in a manner more closely reflecting the detailed structure of the image. Clearer, sharper images result, even at low half-tone densities, since the precise locations of intensity boundaries are stored in the hierarchical model.

The hierarchical data structure retains the principle advantage of a quadtree, namely conservation of relative locality, while providing a way to rapidly distinguish sections of the image which are inside a particular spatial boundary, or window. This also makes the image representation amenable to parallel processing.

BRIEF DESCRIPTION OF THE DRAWINGS

The above and further advantages of the invention may be better understood by referring to the following description in conjunction with the accompanying drawings, in which:

FIGS. 3A through 3D are diagrams showing how a hierarchical data structure is used to represent an image as a group of analytic expressions, with each expression associated with an elemental area of the image, called a tile;

FIGS. 6A through 6C are exemplary pixel data used to explain how a specific sloped tile is encoded;

FIGS. 7A through 7C are exemplary pixel data used to explain how a particular edge tile is encoded; and FIGS. 8-1 and 8-2 depict how a particular supertile is encoded in a hierarchical data structure.

DETAILED DESCRIPTION OF ILLUSTRATIVE EMBODIMENTS

The following discussion includes a description of (1) the general architecture of a computer imaging system used to store and manipulate images in analytic form according to the invention; (2) the hierarchical data structure into which the analytic expressions are fit; and (3) how the analytic expression for each tile or sub-area of an image is derived. The discussion is augmented by several illustrations showing how specific pixel data is encoded in various ways.

(1) GENERAL SYSTEM ARCHITECTURE

Figure 1:
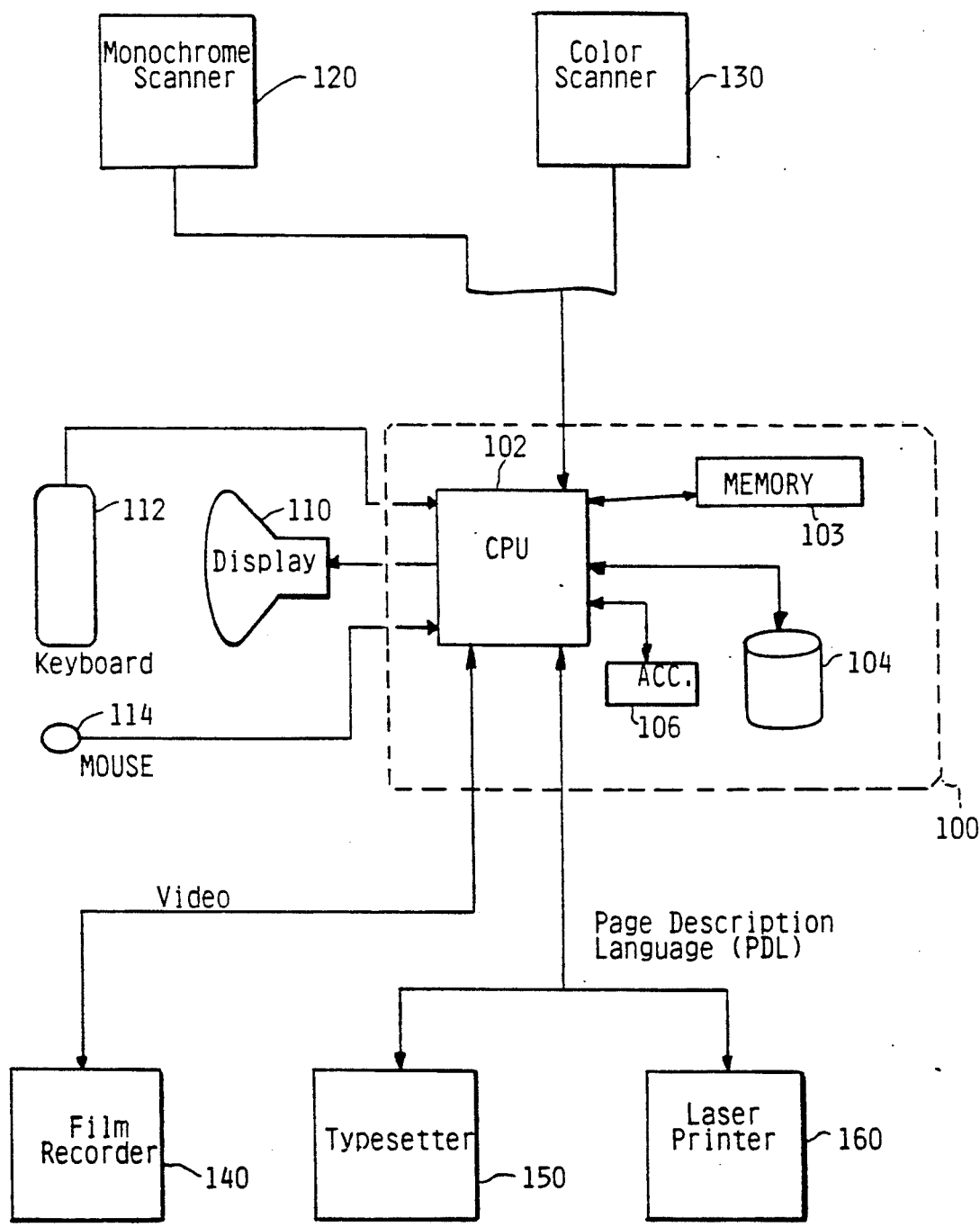
FIG. 1 is a hardware system block diagram of a computer imaging system that generates and makes use of an image representation according to the invention.

FIG. 1 is a hardware block diagram of an exemplary computer imaging system 100 including a central processing unit (CPU) 102, an associated memory 103, and a mass storage device 104. Given the stringent processing time requirements in many image processing applications, the system may also use a processor accelerator 106. Peripheral equipment associated with the system 100 includes input devices such as a keyboard 112, a mouse 114, a monochrome scanner 120, and a color scanner 130; as well as output devices such as a video display 110, a film recorder 140, a typesetter 150, and a laser printer 160. The imaging system 100 and peripherals are of conventional construction and are known in the art. For example, the CPU 102 may be an International Business Machines (IBM) Personal Computer, or other computer adapted to perform the functions described below.

A source image, typically originating in the form of a document or photograph, is fed into one of the scanners 120 or 130, which in turn produces a pixel map representation of the image as an array of pixel values. In the case of monochrome scanner 120, each pixel value typically indicates the light intensity, or grey level, of a particular elemental area, or pixel, of the source image. In the case of color scanner 130, each pixel value typically indicates one or more colorimetric properties of the elemental area, such as the intensity of several primary color channels. The primary color channels may include red, green, and blue (RGB) or cyan, yellow, magenta and black (CYMB). Other non-primary colorimetric encodings such as hue, saturation and value (HSV) may also be used. Thus, in the implementation of the invention described here, although pixel values are described as representing the light intensity of a monochrome image output by monochrome scanner 120, it should also be understood that the invention is not limited to any particular pixel encoding scheme.

The pixel values generated by scanner 120 are organized into a two-dimensional array, or pixel map, by CPU 102. Each value in the pixel map represents the intensity of a corresponding pixel in the source image, with the array coordinates of a particular pixel specifying the spatial position of the corresponding pixel in the source image. The pixel map is stored in the storage device 104 or the memory 103.

In accordance with the invention, the CPU 102 then operates on the pixel map representation to produce one or more analytic expressions for the image. The analytic expressions are stored in a hierarchical data structure in the memory 103 or the storage device 104.

The analytic expressions are free of any restriction or specification dependent upon the spatial or tonal resolution of the scanner 120. When it is time to display the image on one of the output devices 140, 150, or 160, the CPU 102 performs the necessary calculations to render the series of analytic expressions at the resolution of the specific output device. This is done, for example, by generating a description of the image in a suitable Page Description Language (PDL) which includes the desired pixel map representation of the portion or portions of the image which are to be displayed.

The image is not only stored in a compact analytic form, but may also be rendered at a resolution higher than the resolution of the scanner 120. To appreciate how this is accomplished, consider the system software block diagram of FIG. 2. Source image data are acquired by a scanner server 212 which serves as an interface to the scanners 120 and 130. The scanner server 212 produces a pixel map representation PM at the resolution of the scanner, and provides the pixel map PM to an image encoder 215. Encoder 215 performs several operations, as will be described shortly, to generate a device and resolution-independent encoded image EI. The encoded image EI is then stored in an image store area 232, and the original pixel map PM can be discarded. (Image store area 232 may be part of memory 103 or storage device 104). Note that a text store area 234 may contain other information, such as text, which is to be combined with the encoded image EI.

When the image is to be regenerated by an output device, such as display 110 (FIG. 1), the encoded image EI is fed to a server painter 238. The server painter 238 evaluates the analytic expressions in the encoded image EI, given information such as the desired output resolution, and renders a new pixel map representation NPM at the desired output resolution. The new pixel map NPM is forwarded to an application server 250 which then causes the image to appear on the display 110. Operating in conventional fashion, server painter 238 may also subject the encoded image to various graphic manipulations, such as scaling, rotating and clipping, or image processing algorithms, before the new pixel map NPM is rendered.

Other output devices may require a PDL generator 236 to first combine the encoded image EI and text into a Page Description Language (PDL) representation. The PDL representation is then fed to a print server 270 together with the encoded image EI. Print server 270 in turn evaluates the encoded image EI and feeds the combined image and text to output devices such as typesetter 150, film recorder 140 or laser printer 160. Certain of these output devices may require a full page pixel map PM of both rendered text and image. Other devices may directly interpret the PDL description, requiring only the image in pixel map form.

(2) THE QUADTREE/TILE DATA STRUCTURE

The encoded image EI from the image encoder 215 is in the form of a data structure consisting of a two dimensional array of elements called "supertiles". Each supertile is a self-contained unit which fully describes the content and boundary information of an area of the source image, including all information needed by the server painter 238 or print server 270 to render the corresponding area of the source image. Each supertile typically encompasses one or more "tiles", arranged in a hierarchical data structure such as a quadtree, which further represent each sub-area of the source image.

Figure 3A:
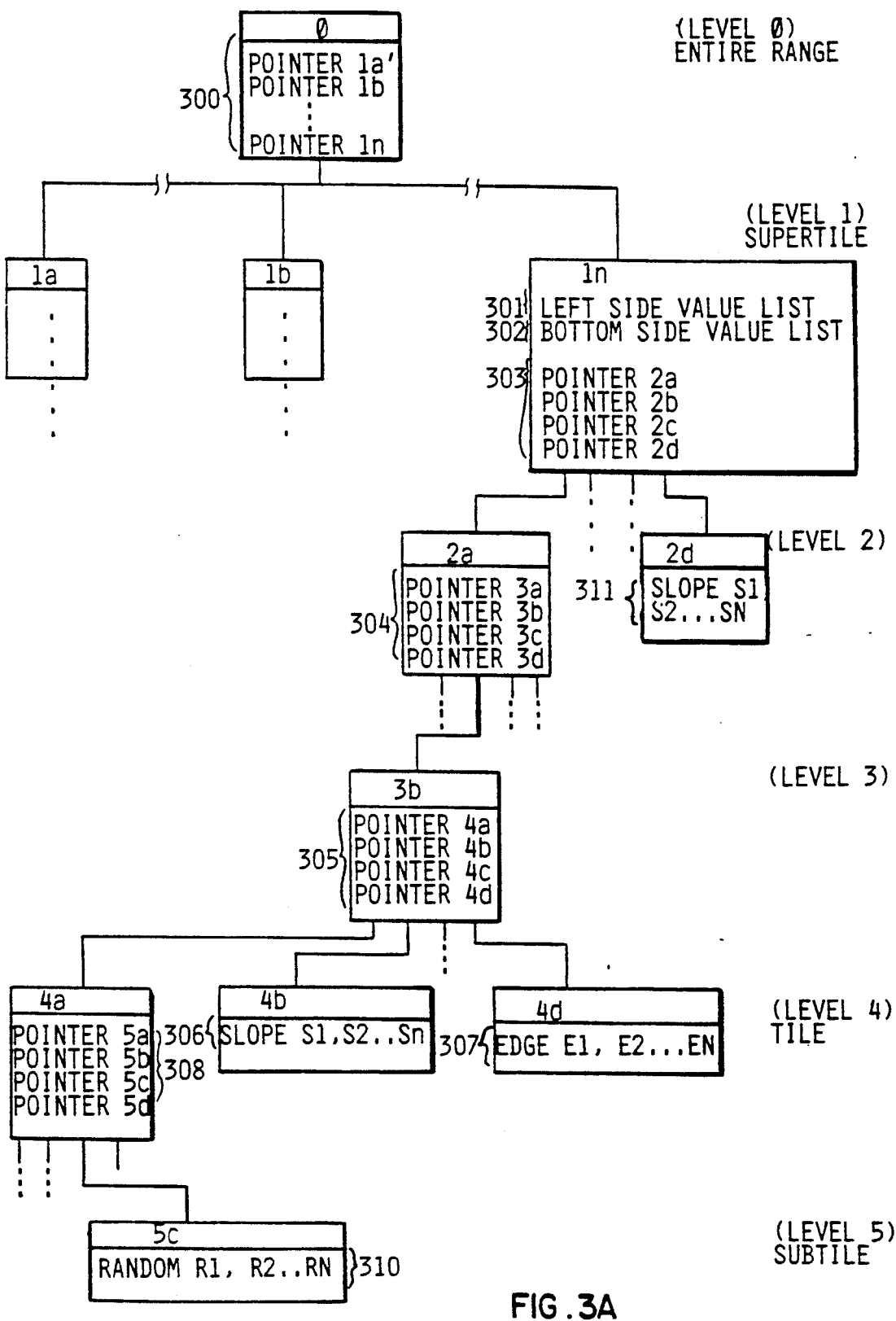

FIG. 3A illustrates an exemplary data structure in accordance with the invention. It is a simple array, or flat, at the highest level, but hierarchical at lower levels. In the illustrated example it has five (5) levels, with the level number of a particular element of the data structure appearing at the top of its description. For clarity, only a part of a complete data structure is shown. An actual encoded image has many elements at level 5, for example. The exact number of levels used at a particular place in the data structure depends upon the nature of the source image data, as will the explained shortly. The hierarchy is preferably a quadtree, so that each of the elements at levels below level 1 contain at most four pointers.

The level 0 element contains a list 300 of pointers to the locations of the elements at level 1, namely elements 1a, 1b, ..., 1n. Each of the elements at level 1 is a supertile. An exemplary supertile, element 1n, contains the boundary information necessary to render it, such as a list of left side inheritance values 301, and a list of bottom inheritance values 302. The origin and use of these inheritance values is described in detail later. The supertile 1n also includes a list 303 of pointers that specify the locations of four elements 2a, 2b, 2c, and 2d of the data structure at the next lower level, level 2. These elements further define how the area of the source image associated with supertile 1n is rendered.

Exemplary element 2a at level 2 contains a description of how a sub-area corresponding to one quadrant of supertile 1n is rendered. In the illustrated example, this consists of a list 304 of pointers to four elements at the next lower level, level 3. However, another element 2d contains a representation of a specific analytic expression 311 which describes how its corresponding quadrant is rendered. The reason for this difference will become evident as the various types of image expressions we use are described below.

The division of sub-areas into quadrants continues at successively lower levels of the quadtree, until an analytic expression is specified for every source corresponding sub-area of the image. For example, an exemplary element 3b at level 3 contains a list 305 of pointers to elements 4a, 4b, 4c, and 4d at level 4.

In the illustrated example, level 4 is considered as the tile level, or that level where analytic expression are initially derived for corresponding sub-areas of the source image. This process is describe in detail in connection with FIGS. 4A through 4E. Thus, exemplary elements 4b, 4c, and 4d contain analytic expression which describe how to render a corresponding sub-area of the source image.

However, if necessary, an additional level 5 of the data structure is included, including elements such as elements 5c, which contains a representation of the sub-area as a list of values. This lowest level is only used when an analytic expression cannot be derived for a sub-area at the tile level.

Figure 3B:
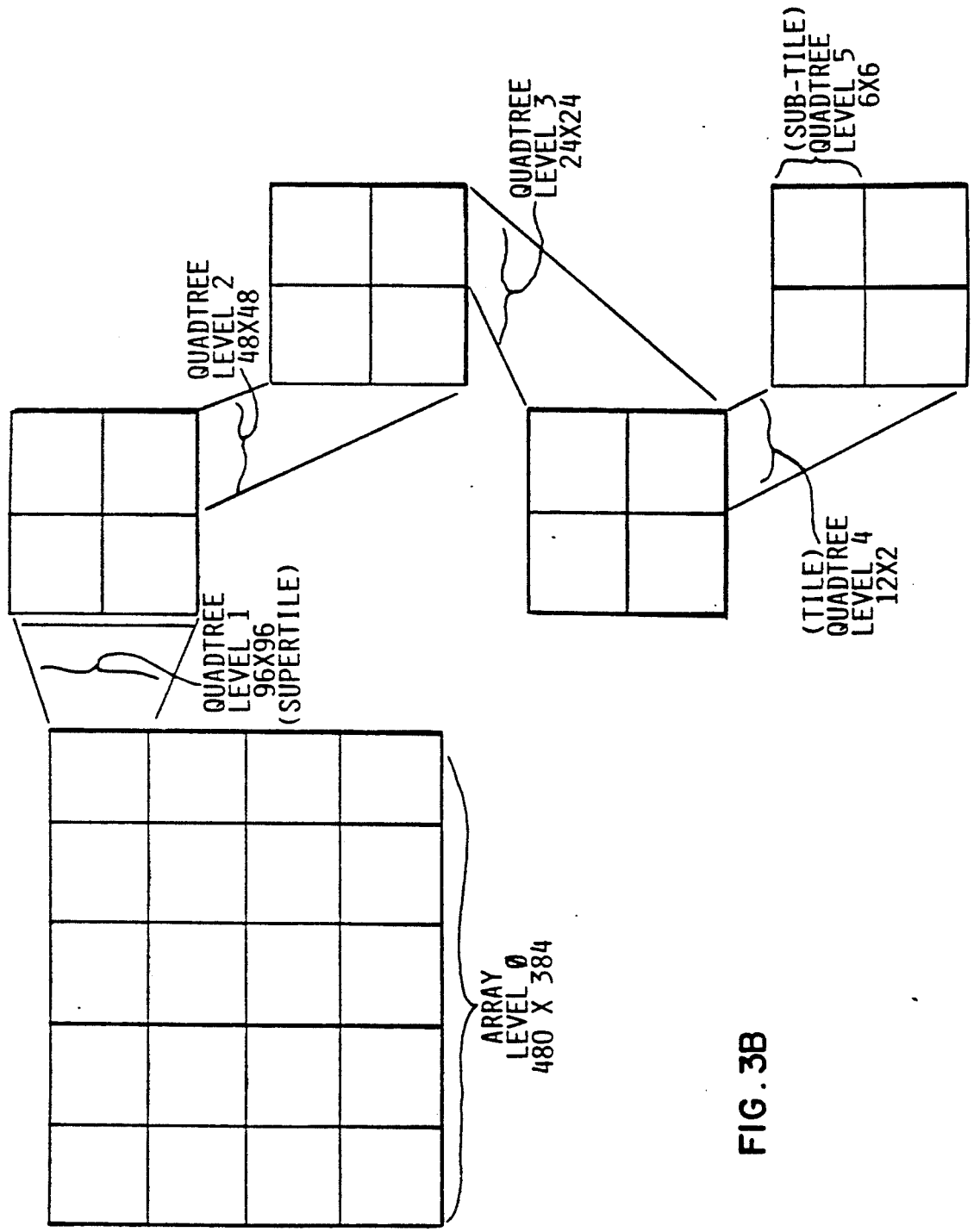

Turning briefly to FIG. 3B, it is seen how the various elements at certain levels in the data structure specify corresponding areas and sub-areas of the source image. In the example shown, the source image encompassed 480×384 pixels. The supertile size is chosen to be 96×96 pixels, so that at level 0, the encoded image is specified as a 4×5 array of supertiles 1a, 1b, ..., 1n.

Each tile encompasses a 12×12 of pixels, at level 4. Thus, the quadtree contains descriptions of four 48×48 sub-areas at level 2, sixteen 24×24 sub-areas at level 3, sixty-four 12×12 sub-areas at level 4, and, if needed, up to two hundred and fifty-six sub-areas at level 5.

The two dimensional array of quadtree supertiles is a unique data structure which solves a significant problem associated with simple quadtree structures. When the sub-area encompassed by each quadtree element is very small and/or there are a very large number of quadtree elements, the overhead of a conventional quadtree structure can become quite large. Using a flat data structure such as an array above a certain level imposes a reasonable limit on the processing overhead required for each tile, while retaining the known advantages of a conventional quadtree. For example, the system 100 can easily identify supertiles positioned at least partially within a clipping boundary, by simply considering their position in the data structure.

As previously mentioned, the pixel values encompassed by each tile are processed to determine how they may be accurately represented by an analytic expression. The possible analytic expressions are of several types, including slope expressions, as in tile 4b (FIG. 3A), edge expressions, as in tile 4d, and random expressions, as in tile 4a. Exemplary pixel data represented as a slope expression are depicted graphically in FIG. 3C. This figure shows a three-dimensional view, with the pixel values plotted along the z-axis as a functions of their relative (x,y) position in the tile. Only every fourth pixel value is plotted for clarity. The pixel values approximate a surface which is a sloped plane, indicated by the dotted lines 350. Thus, in the simplest form of the invention, a slope tile is a group of pixel values that can be represented as an analytic expression for a plane. The gradient of such a plane can be specified as a single parameter. However, other slope tile expression can be used to describe any three-dimensional, continuously sloped surface. An element 4b of the data structure (FIG. 3A) which represents a slope tile thus includes one or more parameters s1, s2, ..., sn for the analytic expression which indicate the particular coordinates and/or gradient of the sloped surface.

Exemplary pixel data represented as an edge tile are depicted in FIG. 3D. Here, a sharp transition 351, or edge, is plainly evident in the pixel values. The resulting surface is thus best represented as two analytic expressions for the surface portions 352 and 354 on either side of the edge 351, together with an expression for the edge 351. Thus, an element 4d of the data structure (FIG. 3A) which represents an edge tile stores these parameters e1, e2, ..., en, which indicate the edge type as well as other information specifying the edge, as will be seen.

The random tile element 4a is used when the corresponding pixel values from the source image cannot be adequately described as a slope or an edge., Such tiles consist of a subset of the pixel values, sampled from predetermined pixels encompassed by the tile.

One advantage of this approach is a material reduction in the amount of data required to describe a source image. This result is not entirely evident at first glance, since a complex image might in principal require a very dense analytical description. However, in practice we have found that about 90% of most source images can be expressed as slope tiles, and thus a distinct advantage does result.

(3) IMAGE ENCODING PROCESS

Figure 4A:
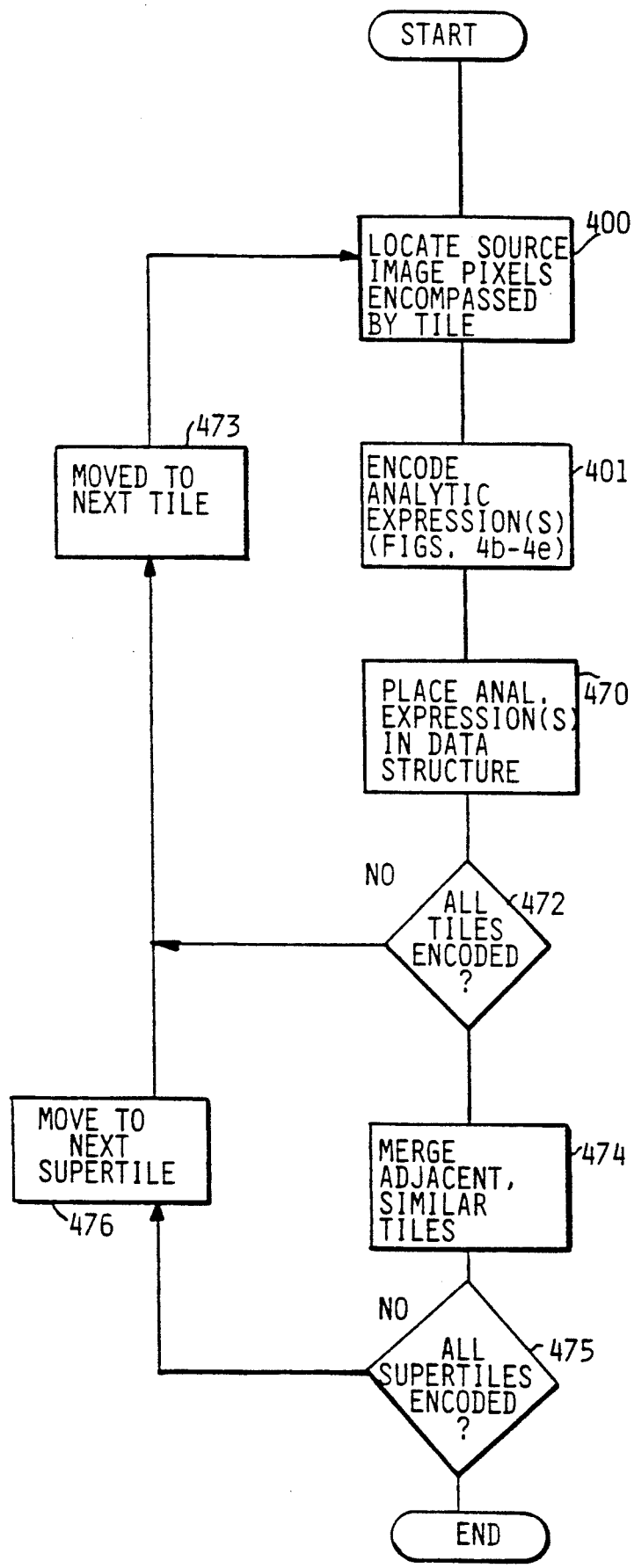
FIGS. 4A through 4E are flow charts of the steps performed by the system to encode a source image.

A more detailed description of the process of encoding the image as a hierarchical data structure containing analytic expressions for each sub-area of the image now follows. Turning attention to FIG. 4A, the first step 400 is to locate the pixel values from the source image associated with a particular starting tile in a particular supertile. These pixel values are then analyzed in step 401, and as detailed in FIGS. 4B through 4E, to determine how they can be encoded as one or more analytic expressions which represent the pixel values to a desired degree of accuracy. In step 470, a code for these expressions and their parameters are then stored in the data structure, in the element of the quadtree hierarchy corresponding to the position of the tile. If all tiles associated with a particular supertile have not yet been encoded, step 472 passes control to step 473, to cause the next tile in the current supertile is considered.

However, if all tile in a supertile have been encoded, then control passes to step 474 where similar tiles are merged. In particular, after an analytic expression is derived for each tile in a supertile, the quadtree is re-examined. If four elements at the same level are found to contain sufficiently similar analytic expressions, they are merged into a single expression located at the next higher level in the tree. The merging process iteratively continues, until the highest level of the quadtree is reached or until adjacent tiles are not sufficiently similar.

Finally, in step 475, if all supertiles have not yet been encoded, control passes to step 476 to initiate the encoding process for another supertile.

Figure 4B:
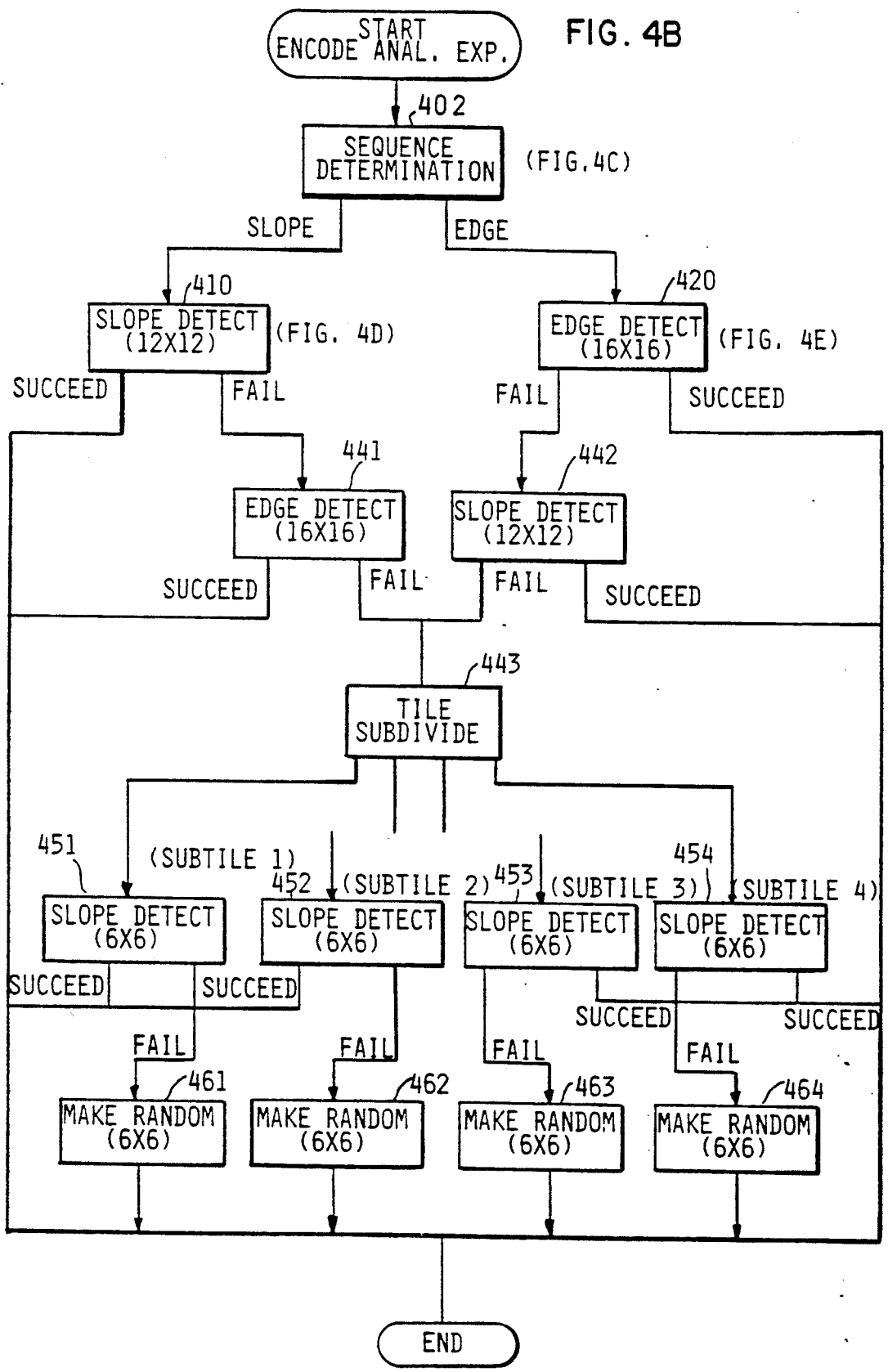

FIG. 4B shows the process of determining the appropriate analytic expression (step 401 of FIG. 4A) for a given tile in detail. This process includes tasks of three general types, namely sequence determination in step 402, slope detection in step 410, and edge detection, in step 420.

As shown in the flow chart of FIG. 4B, the first step 402 is to perform sequence determination. This process, detailed in FIG. 4C, analyzes a few of the pixels encompassed by the tile to determine if they appear to be best suited for slope detection or edge detection. If the conclusion is that slope detection is appropriate, the tile is submitted to the slope detection process, in step 410. Otherwise, the tile is first submitted to the edge detection process, in step 420. Slope detection and edge detection are later described in detail in connection with FIGS. 4D and 4E, respectively.

Continuing with the description of FIG. 4B, if slope detection fails at step 410, the tile is then submitted to the edge detection process, in step 441. Conversely, if edge detection fails at step 420, the tile is then submitted to the slope detection process, in step 442.

If neither edge nor slope detection succeeds, the tile is considered in four sub-tiles, in step 443. In the implementation being discussed, each subtile is $6 \times 6$ pixels. In steps 451, 452, 453, and 454, the four sub-tiles are each submitted to another slope detection process, which attempts to fit a sloped expression to each $6 \times 6$ subtile.

If this process succeeds for a given subtile, then its corresponding analytic expression has been determined, However, if the attempt to find an analytic expression fails, the subtile is represented as a subset of the pixel values in the corresponding quadrant of the tile, in steps 461, 461, 463, and 464. For the $6 \times 6$ subtile implementation being discussed, the preferred subset is a top right corner pixel value from the tile and three other pixel values positioned equidistant from the center of the tile, such as the set of pixel values including the upper right corner values from each one of four quadrants in the sub-tile.

Figure 4C:
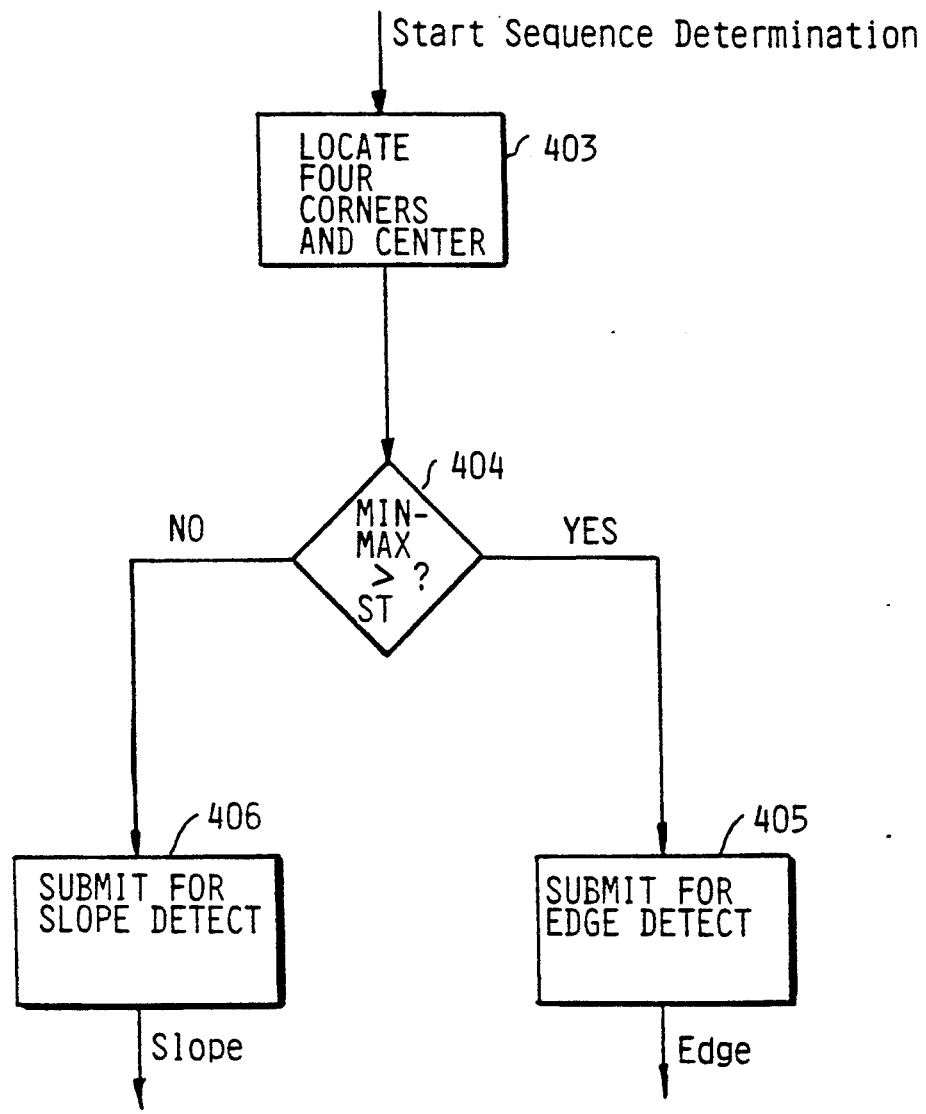

The sequence determination process of step 402 is illustrated in FIG. 4C. The purpose of this process is to determine whether the tile appears, at a quick glance, to be better represented as a slope or edge expression. This is accomplished by first examining the values of the four corner pixels and the center pixel, in step 403. The difference between the maximum and minimum of these values is calculated, in step 404. If this difference is larger than a threshold value, $S_t$, the tile is first submitted for edge detection, in step 405. If this difference is smaller, it is submitted for slope detection, in step 406. The threshold $S_t$ is an empirically derived system parameter. Its value depends upon the number of bits used to represent each pixel value, the desired accuracy of the resulting image representation, and the type of image being scanned.

The sequence determination operation of FIG. 4C is performed primarily as a matter of efficiency. Because it is a simple determination, and in most cases will successfully identify slope tiles, it prevents most slope tiles from first being submitted for edge detection.

Figure 4D:
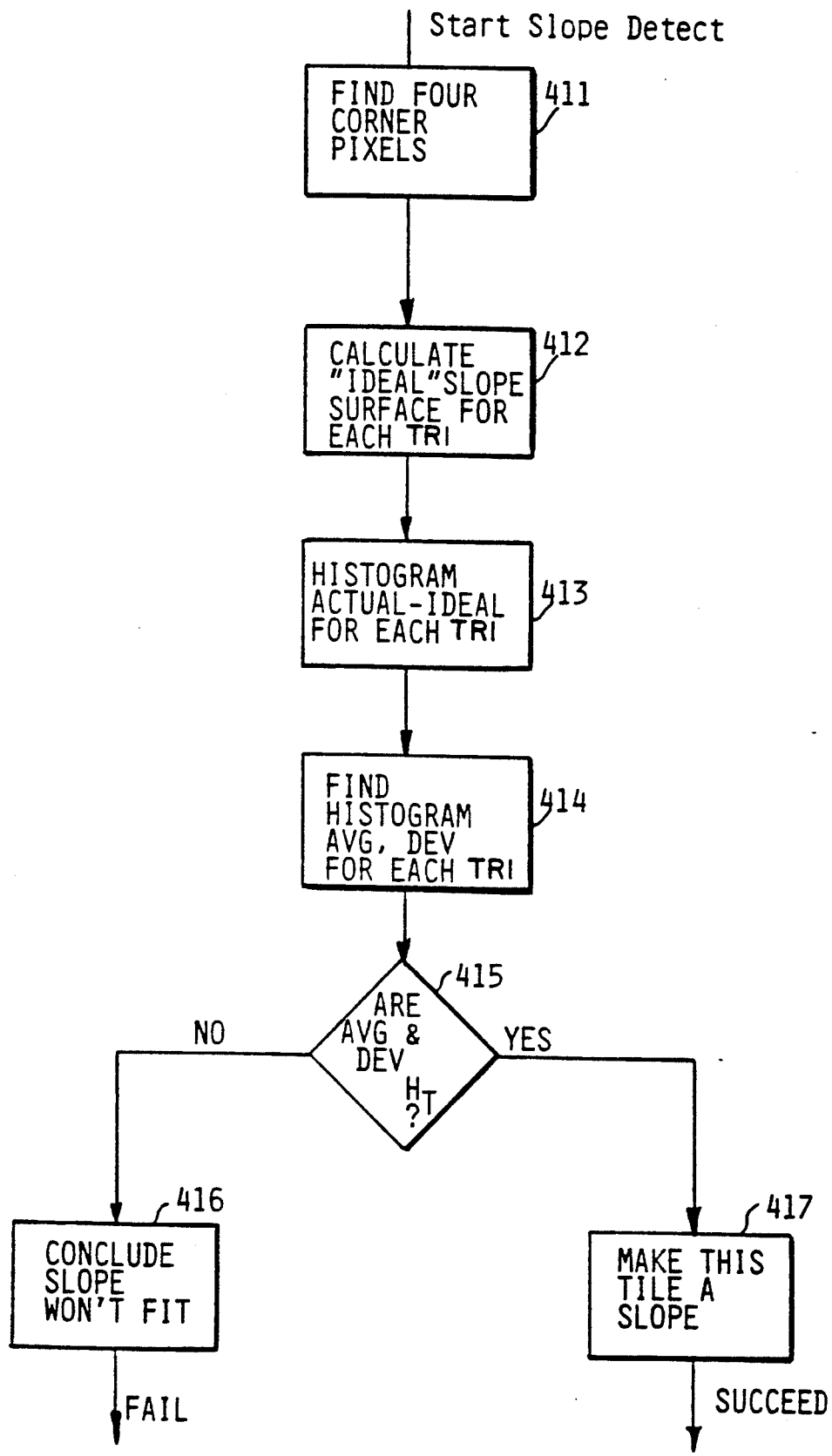

FIG. 4D depicts the slope detection process, which determines if the pixel values from the source image encompassed by the tile can be represented as a slope expression. To understand this representation, it is helpful to visualize the image as a three-dimensional surface, with the depth of the surface given by the intensity value of each pixel, as explained in connection with FIG. 3C.

The slope detection process attempts to closely approximate the surface associated with the tile by representing it as a set of two, equal sized triangles. in the simplest implementation of the invention, each triangle is considered to be a continuously sloped plane, with the gradient of each plane thus specified by the values of its vertices. Thus, a single slope tile actually describes two surfaces with different gradients at different angles from a common central line. The surfaces may have different gradients.

Figure 5A:
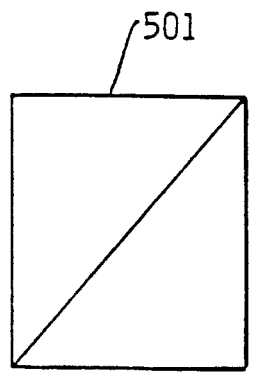
FIGS. 5A through 5C explain the spatial orientation of the types of analytic expression used for sloped tiles in a preferred embodiment.
Figure 5B:
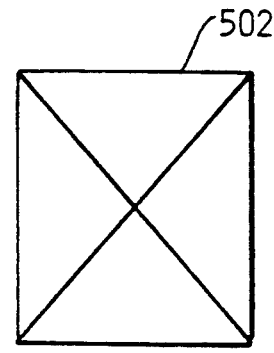
Figure 5C:
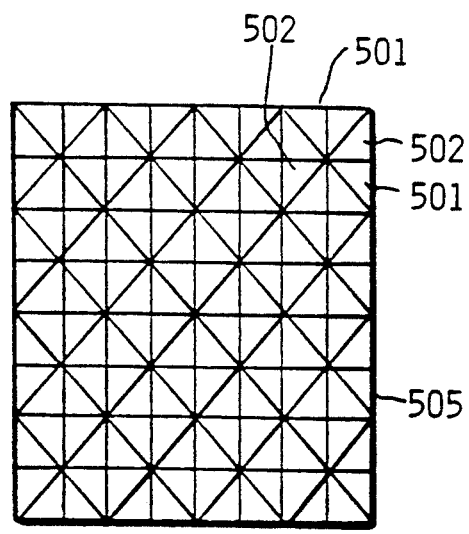

There are two possible ways to split the square area encompassed by a tile into two equal triangles. One such way, using a so-called positive-slope tile 501, divides the tile into an upper left and lower right triangle, as depicted in FIG. 5A. The other orientation, a so-called negative-slope tile, is depicted in FIG. 5B. In accordance with our invention, however, only one of the two possible orientations is considered for a given tile, with the selection depending upon the spatial position of the tile within the supertile. FIG. 5C shows the orientation for the $8 \times 8$ array of tiles that make up a supertile in the specific implementation being discussed. Thus, the positive-slope tiles 501 are interposed with the negative-slope tiles 502.

We have found that because the data structure implies the sign of the slope for each tile, memory can be saved without loss of image quality. In addition, the rendering process also occurs more rapidly. In the implementation described here, the single bit of slope information saved allows each slope tile to be represented as a single data byte, equal to the value of the slope expression at the lower right hand corner of the tile. We have also found that when this is done, the tile merging process is more likely to succeed.

To understand further how a slope tile is encoded, return to FIG. 4D. In step 411, the four corner pixel values are first located. Next, in step 412, an ideal gradient for each of the two triangular areas is calculated from the pixel values at the three corners of each triangle. The deviation of each actual pixel value from the respective ideal surface represented by the gradient is calculated in step 413. In step 414, the deviation data is organized in the form of a pair of histograms, one for each triangle. These histograms will generally be a Gaussian (bell) curve, centered around the average pixel deviation. If an ideal surface is an acceptable approximation to the actual pixel data, the width of each Gaussian will be small and its average will be close to zero. This is determined, in step 415, by adding the width, or standard deviation, of each of the two histograms to its corresponding average value. These two sums are then compared to a threshold value, $H_t$. If either value is above the threshold, the tile is rejected by the slope detection system, in step 416. The slope detection threshold value, $H_t$, is an input parameter to the process, and depends upon the desired accuracy of the image representation. A more accurate representation will use a lower $H_t$ threshold, and thus fail the slope test more often.

Once a tile has been determined to be accurately representable as a pair of slopes, its top right corner value is used as the parameter to be saved in the quadtree. At paint time, the additional three corner values needed to render the two triangles are found by looking up the top right corner values of three adjacent tiles. In other words, these additional value are "inherited" by the tile from its adjacent tiles.

Figure 6C:
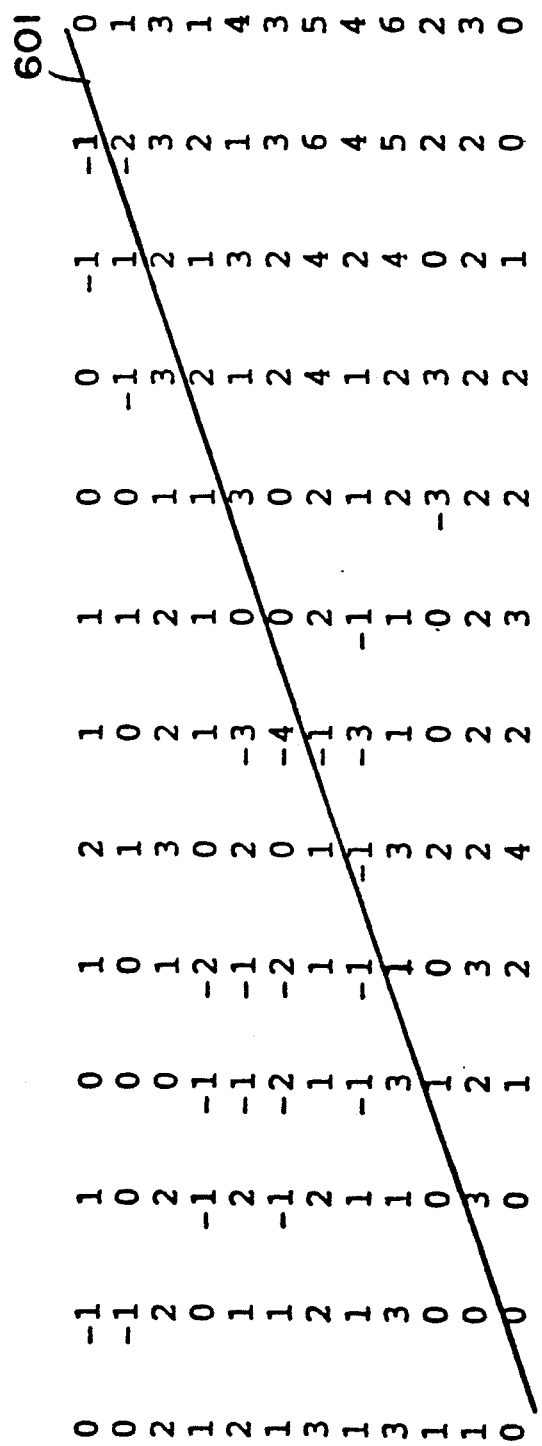

FIGS. 6A, 6B, and 6C show how a slope tile is generated from scanner output data. FIG. 6A shows a scanner output for a $12 \times 12$ tile. This scanner has an intensity resolution of eight bits per pixel, so that the pixel values range in magnitude from 0 to 255. The thirteenth column on the left side is borrowed from the abutting in an adjacent tile, to serve as a mechanism to insure that the resulting analytic representations line up properly along tile boundaries. This tile is in a position in the supertile array requiring a fit to a positive slope. The diagonal center line 601 drawn through the tile delineates the upper left and lower right portions.

FIG. 6B shows the expected values for two ideal sloped planar surfaces fit to the pixel data of FIG. 6A. For example, the upper triangle is a planar surface running through the three values (1,1,240), (1,11,242), and (11,1,243). Similarly, the lower triangle is a planar surface running through (1,12,241), (12,1,243) and (12,12,236).

FIG. 6C is an array of actual minus ideal values. For the illustrated example, average difference and standard deviation values for the two triangles are as follows:

|  | (avg. diff.) | (std. dev.) | (sum) |
| --- | --- | --- | --- |
| Upper left | 0.51 | 1.11 | 2.62 |
| Lower right | 1.76 | 1.30 | 3.06 |

Since both of the sums are less than 3.2, the value used $H_t$ in the implementation being discussed, the tile can be represented by a slope expression. The code generated for this tile is simply GRAY 243, i.e., the value of the slope expression at the lower right hand corner of the tile.

Figure 4E:
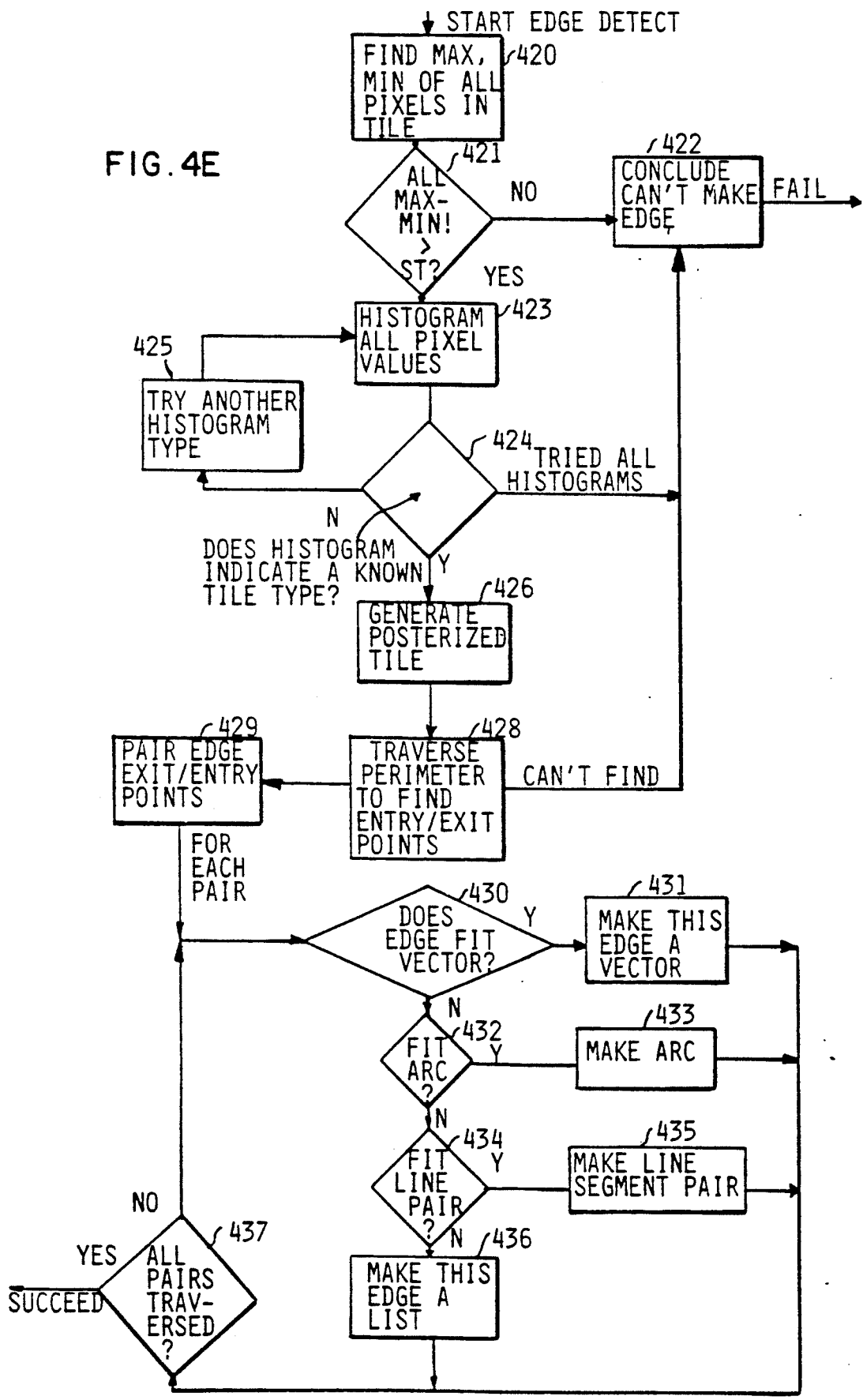

FIG. 4E shows the edge detection process in greater detail. In addition to the pixel data actually contained in the specific tile submitted for processing, pixel data from adjacent tiles are also used. For example, in the 12×12 tile implementation, the process borrows a column of pixels along each side, and a row of pixels along the top and bottom. Thus, it actually operates on a 16×16 array of pixels. This insures overlap between adjacent edge tiles, making the representation more accurate, and leading to increased consistency in the identification of edges that traverse multiple tiles.

As shown in step 420, the edge detection process first examines all pixels being considered to find a maximum and minimum value. In step 421, the difference between these values is determined and compared to the same threshold, $S_t$, as was used during sequence determination (FIG. 4C). Tiles with difference values below the threshold are rejected, in step 422.

Otherwise, the edge detection process then sorts all of the pixels in the tile to generate a value histogram, in step 423.

The value histogram is then used, in step 424, to determine one or more "posterization" thresholds used to further delineate the edges in the tile. In particular, they are used by a process which hard-limits the pixel values encompassed by the tile to one of only a few grey levels. The value histogram is then compared with one or more characteristic value histograms, or templates, which indicate the presence of an edge. In addition, various different histograms may be constructed and examined in an iterative fashion until a match is found or all possibilities are considered. If a particular histogram template is thus not sufficiently similar to the value histogram, the process iterates back through step 425 to step 423, where another value histogram is constructed.

Each value histogram template is associated with an algorithm for generating one or more threshold values to be used for posterizing the pixel data. For example, histograms having different numbers of bins and bins of different sizes, and thus different relative values of posterization thresholds, are tried, until it is determined that there is a sufficient match.

If a particular histogram is not sufficiently similar to one of the predetermined templates, the process iterates through step 425, back to step 423. In the rare event that a tile has passed the maximum/minimum difference test in step 421, but still cannot be classified as a particular type in step 424, the tile is rejected as an edge tile.

For example, one histogram test performed in steps 423 and 424 is to determine if 80% or more of the pixel values fall into only two histogram bins. If this is true, then the tile can be represented as a single, binary edge, with two intensity regions. The proper posterization threshold is thus located between the two bins. Another exemplary histogram test will be described shortly, in connection with the edge tile example of FIGS. 7A through 7C. In the event that a tile passes the maximum/minimum difference test in step 421, but its value histogram still cannot be classified as a particular known type in step 424, the tile is rejected as an edge tile.

However, if, in step 426, a tile has been classified as a particular edge type, the corresponding threshold values are used to posterize the tile. To posterize a tile with two thresholds, for example, all pixels having a value above the higher threshold are given a value corresponding to black, and all pixels below a lower threshold are assigned a value corresponding to white. All pixels between a given pair of thresholds are assigned a single value of grey. The effect of this process is to cause any edges in the sub-area of the source image encompassed by the tile to stand out in sharp contrast.

In step 428, the edge detection process continues by traversing the outermost pixels of the tile, i.e., the pixels positioned along the perimeter of the posterized tile. Adjacent pixels having different values are noted. These are labelled as a possible edge entry/exit point, and the coordinates of all such possible entry/exit points are recorded in step 428. Once the entire circumference of the tile has been traversed, a complete list of all of the points at which edges enter or exit the tile is known. If entry and exit points cannot be found, the tile is rejected.

In step 429, the edge entry/exit points are paired, to find each entry point and a corresponding exit point for each edge. In particular, starting at the first such point in the list, dubbed an entry point, the process following the path of the transitions in pixel value, i.e., it "follows" the edge until it reaches a matching point on the periphery, the corresponding exit point. By repeating this process for each point on the entry/exit point list, a list of entry and exit points for each edge is thus determined.

The system now attempts to derive an analytic description for each edge, as identified by the list of locations along the edge between the entry and exit points. In step 430, the edge is first compared with a single line segment connecting its endpoints. By means of an area comparison technique, this approximation is evaluated, and accepted or rejected. In other words, the expression for a straight line that fits between the entry and exit points is first determined. The difference between the area under the interpolated straight line fit and the area under the actual line defined by the position of pixels along the edge is then calculated. If this difference is above a threshold value, a straight line approximation will not be accepted.

If the difference between the line and the actual edge is sufficiently small, control passes to step 431, where data is generated to represent the edge as a line segment.

In step 432, if the edge is rejected by the straight line comparison, it is then compared with a parabolic segment fit through the entry and exit points. Parabolic segments are preferred, since they include circular arcs as well as other curves. If this representation is sufficiently accurate, step 433 suitably records the edge, by entering the analytic expression for the parabolic segment in the corresponding portion of the tile.

Similarly, in step 434, if the parabolic line segment representation is not sufficiently accurate, the edge is tested to see if it can be represented as a pair of line segments which meet at an internal "turning" point located within the tile. If this is possible, step 435 generates the proper representation in the form of two line segments.

If all else fails, in step 436, the edge is represented by a compacted list of a set of straight line segments along the edge. The list is made as long as is needed to represent the edge to the desired accuracy, up to a limit determined by the number of pixels along the edge.

Step 437 determines if all edges within the tile have been analytically represented, and if this is not the case, control returns to step 430, where the next edge is processed.

When all edges have been fully represented, information regarding the types of edges and their start and end coordinates is stored in the appropriate place in the quadtree for the current tile. The grey values used for each posterization threshold are also stored, which are used when the tile is rendered.

Figure 7C:
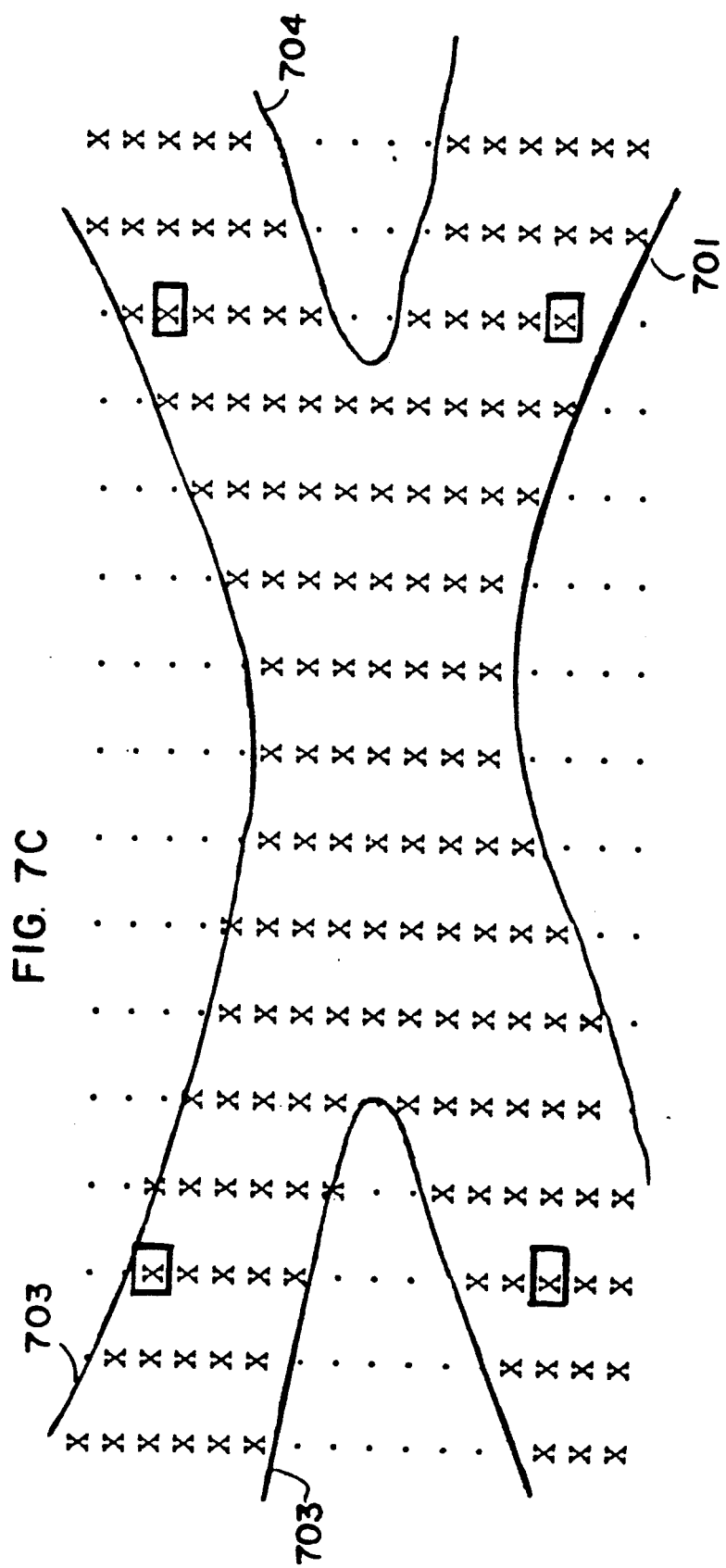

FIGS. 7A through 7C show how a representative edge tile is generated from scanner output data in one implementation of the invention. In FIG. 7A, the pixel values encompassed by an exemplary 12×12 tile are shown, together with pixel values encompassed by adjacent tiles along the two columns and rows on each side. The corner pixels of the current tile are indicated in boxes.

The results of one value histogram, in step 423 (FIG. 4E) are shown in FIG. 7B. The histogram used six bins, uniformly distributed between the minimum and maximum values in the tile.

FIG. 7C shows the posterized tile generated in step 426 (FIG. 4E), with a single posterization threshold set to 174, i.e., the middle of the pixel value range in the array of FIG. 7A. Thus, the "dots" in FIG. 7C indicate white pixels, and the "X's" indicate black pixels. The four edges, 701, 702, 703, and 704, indicated by solid lines, are clearly visible from this posterized representation. The code generated for this tile is

```
EDGES: 229, 226, 4
121 :: PBB 0:12, 4:9
127 :: CTT 1:7, 4:2
121 :: CLL 1:7, 9:5
152 :: CRR 4:7, 1:5
``` with edges; indicating the tile type, 229 indicating the upper right hand corner gray value, "226" a gray value which should be used as the background intensity when rendering the tile, and "4" indicating the number of edges.

"PBB 0:12, 4:9" indicates the bottom edge 701, specified as a pair of line segments meeting at an internal turning point. PBB is interpreted as follows. The P indicates a pair of line segments. The first B indicates that the edge entry point is along the bottom of the title, and the second B indicates that the edge exit point is also along the bottom of the tile. "0" and "12" indicate the x-coordinate of the entry and exit points along the bottom edge, and "4:9" indicates the x- and y-coordinates of the internal point. A further understanding of the preferred analytic expression and codings can be had from the picture language glossary at the end of this section.

"CTT 1:7, 4:2" indicates the top edge 702, specified as a parabolic segment, with the associated entry and exit points. "4:2" indicates the internal point, which is on the tangent line for the parabolic segment.

"CLL 1:7, 9:5" and "CRR 4:7, 1:5" specify the left and right side parabolic line segment edges 703 and 704, respectively.

The area inside of and encompassed by the four edges is rendered at the intensity "226". Other implementations may render this area as a slope which fits through the color values associated with each edge. The four areas outside of the edges are rendered at the intensities "121", "127", "121", and "152", respectively.

Note that there may be additional encodings such as grey level normalization, or point list compaction, known in the art. These further reduce the number of bits needed to represent each tile.

FIGS. 8-1 and 8-12 contain an exemplary complete supertile as generated by the process of FIGS. 4A-4E. It should be read in conjunction with the following picture language glossary. Generally speaking, the STBEG data structure 800 indicates the start of a supertile. LRUN 801 and BRUN 802 are a list of left and bottom top right corner pixel values taken from the tiles along the periphery of the adjacent supertiles. PUSH, such as 805, is a signal that the next element of the quadtree is at the next lower level. The corresponding "POP" is implied after four tiles are encountered at the same level. Thus, the first tile descriptor, GREY 198, indicated at 806, is at the fifth level in the supertile.

Figure 2:
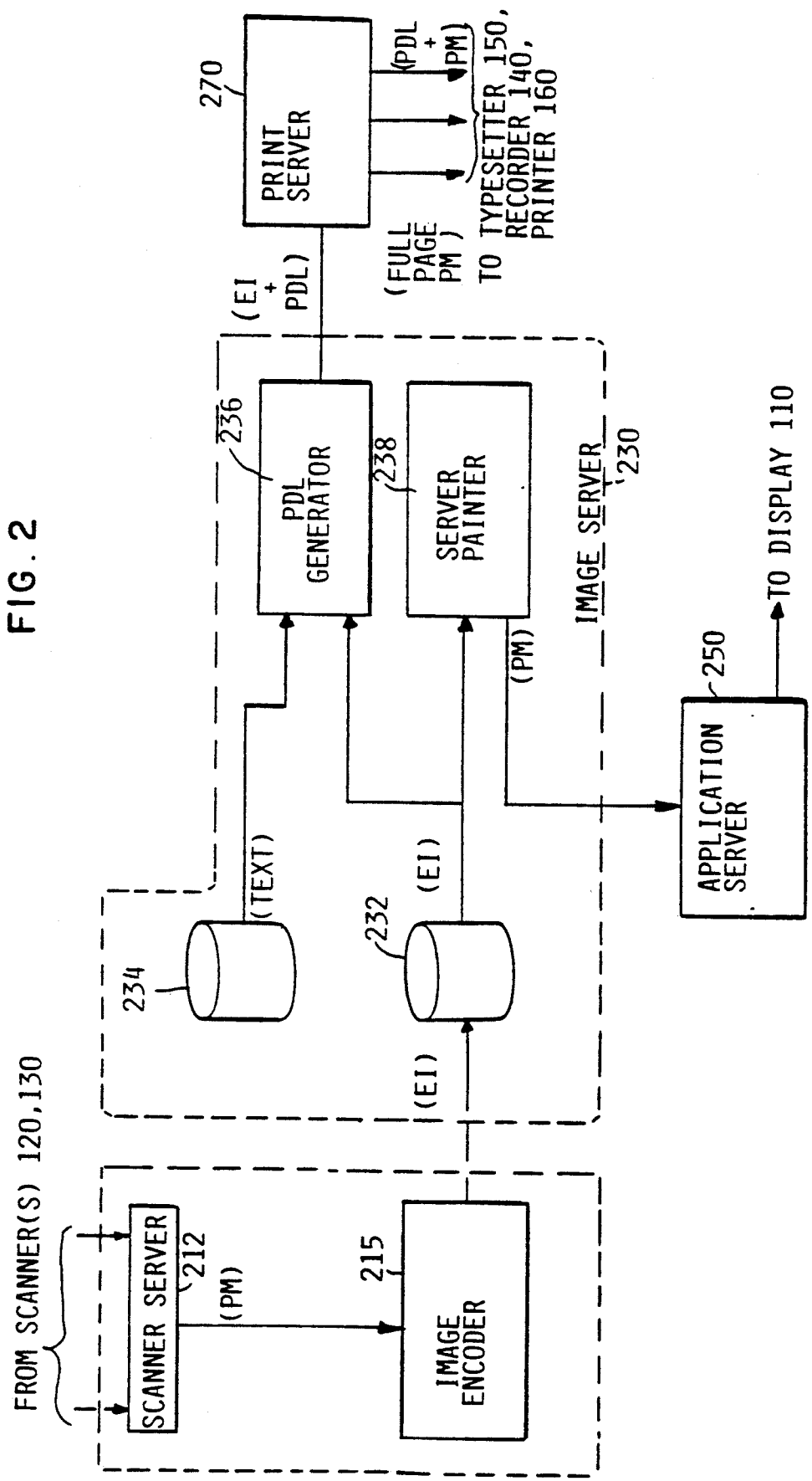
FIG. 2 is a software system block diagram of the imaging system.

A further understanding of the exemplary supertile in FIGS. 8-1 and 8-2 can be had from the following glossary.

STBEG: VAL, LINBYTES

VAL is the grey (or color) value of the top right corner of the supertile. LINBYTES is the length in bytes of the supertile description.

LRUN: v0, v1, ..., vn

Left edge inheritance initialization values. These are grey (or color) values to be used as the left adjacent tile values by all of the tiles along the left side of this supertile. $n = 2^x$, where x is the maximum permissible quadtree depth.

BRUN: v0, v1, ..., vn

Bottom edge inheritance initialization values. These are grey (or color) values to be used as the bottom adjacent tile values by all of the tiles along the bottom side of this supertile. The value of n is calculated as in LRUN.

PUSH

Go down one level in the quadtree. The matching "POP" function is implied at each level, after all four tiles at that level have been encountered in sequence.

Slope Random Tile Representations

GREY: VAL

Indicates a slope tile. VAL is the top right corner grey (or color) value. All other corner grey (or color) values needed to render this tile are inherited, by examining the top right corner values from adjacent tiles.

GREY1:VAL, CODE, SUBVAL
equivalent to:
PUSH
   GREY
   GREY
   GREY
   GREY

VAL is the top right corner grey (or color) value of the tile. CODE is a compaction key. SUBVAL is a list of top right corner grey (or color) values for the subtree, in compacted form.

GREY2: VAL, CODE, SUBVAL0, SUBVAL1
equivalent to:
PUSH
   GREY
   GREY
   GREY
   RANDOM Again, VAL is the top right corner grey (or color) value of the tile. CODE is a compaction key. SUBVAL0 is a list of top right corner grey (or color) values for the subtree one level down, SUBVAL1 is a compacted list of values sub-sampled from the source image at other predetermined places in a RANDOM tile.

GREY5:VAL, CODE, SUBVAL0, ..., SUBVAL4
Equivalent to
PUSH
   RANDOM
   RANDOM
   RANDOM
   RANDOM VAL is the top right corner grey (or color) value of the tile. CODE is a compaction key. SUBVAL0 is a list of top right corner grey (or color) values for the subtree one level down, SUBVAL1, ..., SUBVAL4 are lists of grey (or color) values sub-sampled for each tile in compacted form.

Edge Tile Representations

EDGES: VAL1, VAL2,ENUM,EVAL0,ETYPE0,EDATA0, ... EVALn, ETYPEn,EDATAn

Indicates a tile containing multiple edges. VAL1 is the corner grey (or color) value. VAL2 is the background grey (or color) value. ENUM is the number of edges. EVAL specifies a grey (or color) value supplied for each edge. ETYPE is the edge type, and EDATA is a string supplying exit, entry, and internal points for each edge.

The possible ETYPEs are as follows below, with abbreviations used as follows:
   P—pair of line segments, with one internal turning point
   L—a line edge
   C—a parabolic segment edge
   B, T, L, R—bottom, top, left, and right The last two letters of an ETYPE descriptor tell the side from which the edge enters and exits.

LIST-TB, EN/EX, PNUM, IP1, ... IPpnum

Indicates an edge specified as a list of line segment end points. EN/EX are the coordinates of the entry and exit points. PNUM is the number of internal points. IP is the relative internal position of each point.

PLB: EN/EX, VAL, IP

Indicates a single edge tile, consisting of a vector with one internal turning point, which enters through the left side and exits through the bottom of the tile. EN/EX gives the entry and exit points along the indicated sides of the tile. VAL is the top right corner grey (or color) value. IP is the relative position of the internal turning point.

LTB: EN/EX, VAL

Indicates a single edge tile, consisting of a vector which enters through the top and exits through the bottom of the tile. EN/EX gives the entry and exit points along the indicated sides of the tile. VAL is the top right corner grey (or color) value.

Other edge tile types are possible—the aforementioned three are meant only as an example.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A system for developing an analytic representation from a pixel map representation of a source image, the pixel map including an array of pixel values, the system comprising:

means for arranging the pixel values into a plurality of pixel groups, each pixel group thus being a pixel map representation of a portion of the source image;

means for generating an analytic expression for a pixel group, the analytic expression being a mathematical function that relates each pixel value to its relative spatial position in the pixel group, and thus representing the pixel group as an array of points on a three-dimensional, continuously sloped surface;

means for comparing the pixel values in the pixel group to the analytic expression, and thus determining whether the pixel group can be represented, to a predetermined accuracy, as the three-dimensional, continuously sloped analytic expression; and means for determining whether the pixel value group contains an intensity boundary, if the corresponding analytic expression does not represent the pixel values in the pixel group to a predetermined accuracy, by calculating a difference between a minimum and a maximum pixel value among the pixel values in the pixel group, and then comparing that difference to a predetermined threshold value; and generating another analytic expression that represents the pixel group in the form of a mathematical function that fits the two-dimensional spatial coordinates of the intensity boundary, it the difference exceeds the predetermined threshold value.

2. A system as in claim 1 wherein the means for determining whether the pixel value group contains an intensity boundary additionally comprises:

means for producing a posterized element version of the pixel group, the posterized element containing the intensity boundary delineated in sharp contrast;

means for examining the pixel values along the periphery of the posterized element, to indentify the coordinates of peripheral pixel values that indicated entry and exit points of each intensity boundary of the posterized element;

means for pairing the entry and exit points; and means for generating a list of the coordinates of pixels along the intensity boundary by starting at each entry point, following the intensity boundary, recording the local of each pixel on the boundary, and continuing until the coordinates of the exit point are reached.

3. A system as in claim 1 additionally comprising:
means for successively subdividing each pixel group into smaller sub-groups if the means for determining decides a pixel group cannot be represented as an analytic expression, the subdivision of the pixel groups continuing until the sub-groups can be represented as analytic expressions to a predetermined accuracy, or until a minimum sub-group size is reached.

4. A system as in claim 1 additionally comprising:
means for representing the analytic expressions as elements in a hierarchical data structure, each element of the data structure thus representing the analytic expressions for a corresponding portion of the image.

5. A system as in claim 4 wherein the hierarchical data structure has a predetermined maximum number of levels.

6. A system as in claim 4 wherein the hierarchical data structure is arranged as a simple array data structure above a certain level, with least one level of the data structure being a simple array.

7. A system as in claim 4 wherein the hierarchical data structure also includes, for each element, an intensity value at one fixed position in the portion of the image encompassed thereby, the intensity value specifying how each element and its adjacent elements are to be rendered, and the fixed position being the same for each element in the data structure.

8. A system as in claim 4 wherein the means for arranging the analytic expressions additionally comprises:
means for iteratively analyzing the analytic expressions for elements at the same level in the hierarchy, and for determining if they contain the same type of analytic expression, and if so, for merging them into a single expression positioned at a higher level in the hierarchical data structure, until the highest level possible is analyzed.

9. A system as in claim 4 wherein the means for comparing additionally compares the pixel value associated with an element in two groups, to determine if the element can be represented as a pair of three-dimensional continuously sloped surfaces to a predetermined accuracy.

10. A system as in claim 4 wherein the means for generating the representation also outputs an intensity value at one fixed position in the element, the intensity value specifying how each element and its adjacent elements are to be rendered, and the fixed position being the same for each element in the data structure.

11. A system as in claim 1 additionally comprising:
means for rendering the image representation by evaluating the analytic expressions.

12. A system as in claim 1 wherein the means for generating a representation additionally comprises:
means for representing the element as a sub-set of pixel values from the corresponding pixel group is neither the two-dimensional analytic expression that represent the intensity boundary nor the three-dimensional linearly sloped analytic expression represents the corresponding pixel values to a predetermined accuracy.

13. A system as in claim 1 wherein the means for generating a representation additionally comprises:
means for interpolating the spatial coordinates of the intensity boundary to calculate parameters of a straight line representation.

14. A system as in claim 1 wherein the means for generating a representation additionally comprises:
means for interpolating the spatial coordinates of the intensity boundary to calculate parameters of a parabolic segment representation.

15. A system as in claim 1 wherein the means for generating a representation additionally comprises:
means for interpolating the spatial coordinates of the intensity boundary to calculate parameters of a plurality of straight-line sections.

16. A system as in claim 1 wherein the means for generating a representation additionally comprises:
means for interpolating the spatial coordinates of the intensity boundary to calculate parameters of a pair of lines that meet at a point internal to the corresponding portion of source image.

17. A system for developing an analytic representation from a pixel map representation of a source image, the pixel map including an array of pixel values, with each pixel value indicating a colorimetric property of an elemental area of the source image, the system comprising:
means for arranging the pixel values into a plurality of pixel groups, each pixel group thus being a pixel map representation of a portion of the source image;
means for determining an analytic expression for each pixel group, the analytic expression being a mathematical function that relates each pixel value to its relative spatial position in the pixel group, and thus representing the pixel group as an array of points on a three dimensional surface, the means for determining additionally comprising:
means for representing the analytic expressions as elements in a hierarchical data structure, each element of the data structure thus representing the analytic expressions for a corresponding portion of the image;
means for deciding whether the pixel group encompassed by an element contains one or more intensity boundaries; and
means for generating a representation of one or more analytic expressions that represent spatial coordinates of the intensity boundaries, the means for generating a representation additionally comprising:
means for producing a posterized version of the element, the posterized element containing the intensity boundary delineated in sharp contrast;
means for examining the pixel values along the periphery of the posterized element, to identify the coordinates of peripheral pixel values that indicate entry and exit points of each intensity boundary of the posterized element;
means for pairing the entry and exit points; and
means for generating a list of the coordinates of pixels along the intensity boundary by starting at each entry point, following the intensity boundary, recording the location of each pixel on the boundary, and continuing until the coordinates of the exit point are reached.

18. A method for encoding a sampled source image as pixel map stored in a memory of a computer imaging system, the pixel map including an array of pixel values, wherein each pixel value represents a colorimetric property of an elemental area of the sampled source image, the method comprising the steps of:

selecting a rectalinear portion of the source image, called a "supertile", to be encoded, the supertile being composed of sub-portions called "tiles";

determining the coordinates of a pixel in a corner of the supertile;

selecting from the pixel map a list of pixel values spaced along a vertical periphery of the supertile, with at least one pixel value from each tile positioned along the vertical periphery;

selecting from the pixel map a list of pixel values spaced along a horizontal periphery of the supertile, with at least one pixel value from each tile positioned along the horizontal periphery;

deriving a set of analytic expressions, each expression representing the pixel values in a tile, and each expression being selected from the group consisting of:

i. a list of pixel values sampled from a corresponding portion of the source image;

ii. an edge descriptor, including an indicator of a number of edges in a corresponding portion of the source image, an expression type for each edge, and parameters for each edge expression; and iii. a slope descriptor, indicating one pixel value for a corresponding area of the source image; and storing the value list and descriptors in the memory of the computer imaging system.

19. A method as in claim 18 wherein the edge descriptor additionally comprises an expression type indicator that includes a list of coordinates that define an edge in the source image.

20. A method as in claim 18 wherein the edge descriptor additionally comprises parameters of a straight line that represents the coordinates defining an edge to a predetermined degree of accuracy.

21. A method as in claim 18 wherein the edge descriptor additionally comprises parameters of a pair of straight lines that represent the coordinates defining an edge to a predetermined degree of accuracy.

22. A method as in claim 18 wherein the edge descriptor additionally comprises parameters of a parabolic segment that represents an edge to a predetermined degree of accuracy.

* * * * *